METHOD OF SEPARATING AXLE COUPLINGS.
APPLICATION FILED JULY 6, 1909.
961,375.
Patented June 14, 1910.
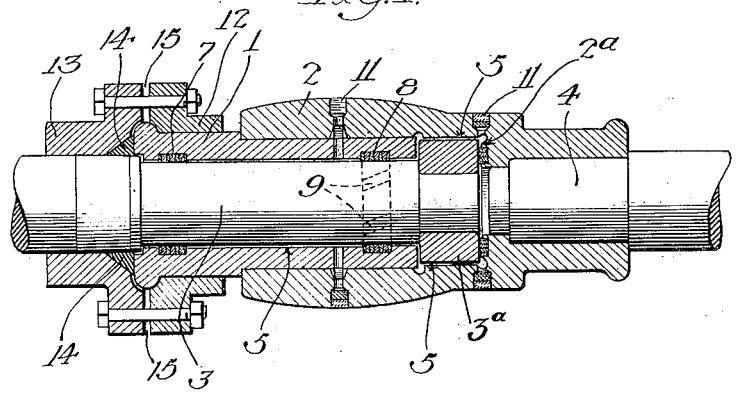
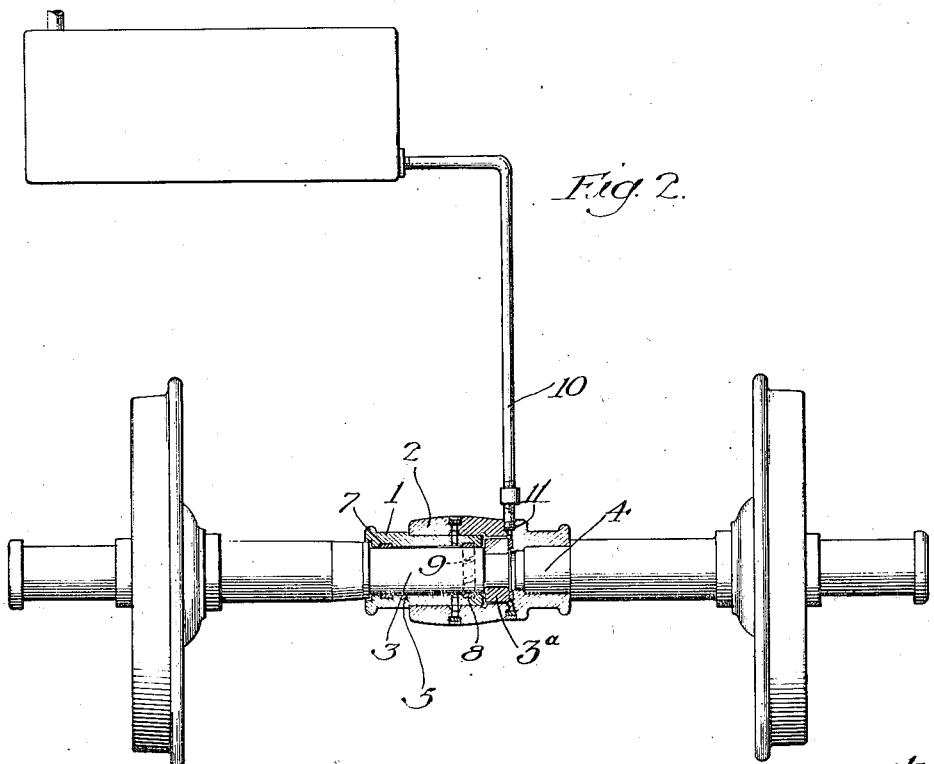
Witnesses:
Inventor:
Bagster Roads Seabrook.

UNITED STATES PATENT OFFICE.

BAGSTER ROADS SEABROOK, OF LOS ANGELES, CALIFORNIA.

METHOD OF SEPARATING AXLE-COUPLINGS.

961,375.

Specification of Letters Patent. Patented June 14, 1910.

Application filed July 6, 1909. Serial No. 506,230.

*To all whom it may concern:*

Be it known that I, BAGSTER ROADS SEABROOK, a subject of the King of England, residing at Los Angeles, in the county of Los Angeles and State of California, have invented a new and useful Method of Separating Axle-Couplings, of which the following is a specification.

This invention relates to a method of separating axle couplings, and is of especial value in separating the couplings of differential axles of which a former patent of mine No. 910,424 of January 19, 1909, is a type. In such type of axles the parts are telescopically united by friction between the parts, the parts in union having a press fit and having been forced together by great pressure. The methods heretofore known of separating such axle couplings have consisted of applying force in opposite directions against external flanges on the coupling by any of the devices well known in machine shop practice, but such methods were impracticable owing to the difficulty of keeping the separating means in engagement with the flanges, the size of which in a device of this character must be small. The difficulty lay, not in procuring sufficient power, but in applying such power to the parts to be separated. This difficulty was increased on account of the shape and compact relation of the parts. With my method these difficulties are entirely overcome and a perfect application of power is secured so that in the construction of the coupling the parts may have even greater retaining friction between them, it not now being necessary to consider the question of separation so far as tight fit is concerned.

In axles of the type mentioned there is a chamber or space between the parts to be separated, which chamber is sealed and of fixed dimensions, and my method of separation consists of introducing a fluid into the chamber between the parts under a pressure sufficient to overcome the great friction between the parts and move them out of engagement with each other. The friction is overcome partly by main force of the pressure tending to separate the parts and also by reducing the friction by reason of the expansion of the outer sleeve due to the high pressure of the internal fluid.

In the accompanying drawings, Figure 1 is a sectional view through the axle coupling. Fig. 2 is a sectional view on a reduced scale through the coupling and shows the attachment of the pressure introducing means.

The inner collar 1 is frictionally nested in the outer collar 2. One member 3 of the axle is revoluble in the inner collar 1, while the other axle member 4 is rigid in the outer sleeve 2 and rotates therewith and with the inner collar 1. The separation of the outer collar 2 from the inner collar 1 is to be effected. This will obviously uncouple the two members of the axle.

5 is a space or chamber within the inner collar 1 and within the outer collar 2. This chamber is sealed at the outer end of the collar 1 by the close fitting ring 7. The ring 8 has rifle grooves 9 so that the space 5 is not divided. The space or chamber 5 is obviously closed at the end opposite the ring 7 by the member 4 fitting tightly in collar 2 and by collar 2 fitting tightly on collar 1. Passages 11 are employed for the introduction of lubricant and after the same has been introduced they are plugged up with disks and steel cement.

By connecting pipe 10 with one of the passages 11 at the shoulder $2^a$, which communicates with the space between the two ends of the axle members, hydraulic pressure is applied therethrough of a minimum total of seventy five tons for an eight inch coupling, which pressure enters the chamber 5 and distends the outer collar 2, thus lessening the friction between collars 1 and 2, and at the same time acting against the inner shoulder $2^a$ and retaining collar $3^a$ forces the axle member 3, collar $3^a$, and sleeve 1, out of the sleeve 2. The pressure required to separate them will obviously depend upon the amount of friction between the parts and hence the pressure above named is subject to variation. Sometimes the pressure required to separate the parts is so great that it leaks past the ring 7. In such cases a split collar 12 is applied to the sleeve 1, and a split collar 13 is applied to the axle member 3, and a lead packing 14 is squeezed into the corner of the bearing between axle member 3 and sleeve 1 by tightening bolts 15 which draws the split sleeve 13 toward the sleeve 12 and tightly compresses the lead around the crack, thus effectually sealing it and holding the pressure.

What I claim is:—

The method of separating frictionally nested parts which consists of distending the outer part by the introduction of fluid under pressure and thus reducing the friction and displacing the inner part by continuing the introduction of fluid.

In testimony whereof, I have hereunto set my hand at Los Angeles, California, this 19th day of June 1909.

BAGSTER ROADS SEABROOK.

In presence of—
G. T. HACKLEY,
FRANK L. A. GRAHAM.